United States Patent [19]
Draeger

[11] Patent Number: 6,114,622
[45] Date of Patent: Sep. 5, 2000

[54] PERSONAL COMPUTER CHASSIS WITH HINGED SIDE WALL

[75] Inventor: Ronald Michael Draeger, Minneapolis, Minn.

[73] Assignee: Bermo, Inc., Circle Pines, Minn.

[21] Appl. No.: 09/073,537

[22] Filed: May 6, 1998

[51] Int. Cl.$^7$ ...................................................... H05K 9/00
[52] U.S. Cl. ...................... 174/35 R; 361/816; 361/683; 361/686; 361/753; 361/800
[58] Field of Search .......................... 174/35 R; 361/816, 361/818, 683, 686, 753, 799, 800

[56] References Cited

U.S. PATENT DOCUMENTS

| | | | |
|---|---|---|---|
| 5,031,070 | 7/1991 | Hsu | 361/686 |
| 5,694,291 | 12/1997 | Feightner | 361/683 |

OTHER PUBLICATIONS

NLX Motherboard Specification, Release 1.2, pp. 1–67, Copyright © 1997, Intel Corporation.

*Primary Examiner*—Hyung-Sub Sough
*Assistant Examiner*—Hung V Ngo
*Attorney, Agent, or Firm*—Merchant & Gould P.C.

[57] ABSTRACT

A personal computer chassis including a bottom element, front and back walls, and a side wall. The front wall is mounted to a front end of the bottom element, and the back wall is mounted to the back end of the bottom element. The side wall is hinged to a first side end of the bottom element. When the side wall is in a closed position, it is capable of engaging with the front wall and the back wall. The side wall may help the chassis maintain an EMI shield for the computer. The side wall may be configured to allow opening and closing without the use of a tool. Moreover, the side wall may optionally remain attached to the bottom element when opened such that the side wall can not readily be lost or misplaced. The hinged side wall may include reinforcement members extending generally perpendicularly outward from its edges, for improving the structural integrity of the chassis in the closed position. The disclosure further shows a computer chassis having a back wall defining an access opening. The chassis also includes a slot bracket covering a portion of the access opening. The slot bracket includes at least one slot for providing access to I/O expansion ports inside the chassis. When the slot bracket is mounted in the opening in the back wall, the remainder of the access opening forms an opening suitable for an NLX I/O back panel.

21 Claims, 7 Drawing Sheets

PERSONAL COMPUTER CHASSIS WITH HINGED SIDE WALL

FIELD OF THE INVENTION

The present invention relates generally to structures for housing electronic equipment. More particularly, the present invention relates to personal computer chassis.

BACKGROUND OF THE INVENTION

The development of computer hardware is a continuously changing technology. To match newly developed hardware components, the chassis that surrounds the hardware of the computer must be adapted accordingly. Today, the computer chassis must not only accommodate a variety of different input and output ports, but must also provide an easy access for exchanging pieces of hardware when the operator wishes to upgrade the computer.

Recently, the NLX motherboard form factor was introduced in the computer market. It is expected that this form factor for motherboards will become increasingly popular, and that a number of computer hardware manufacturers will produce computers capable of being provided with a motherboard conforming to the NLX standard. The NLX form factor is thoroughly described in "NLX Motherboard Specification," published by Intel Corporation, 1997.

A computer chassis in conformity with the NLX form factor includes a mother board (circuit), an input/output (I/O) back panel, and a riser card, rising vertically from the circuit board. The circuit board includes a number of components of the motherboard, most essentially the processor of the motherboard. The riser card receives a connection from the power supply of the computer, and also contains connections to peripheral components of the computer such as a floppy drive, a CD drive, and the hard disk. The I/O back panel contains connectors for attaching external units such as the keyboard, the mouse, etc.

A conventional (ATX) computer chassis typically has an I/O opening on its back wall into which the I/O back panel can be fit when the motherboard is inserted into the computer. The I/O opening provides access to connectors on the I/O back panel when the computer is fully assembled. In addition to the I/O opening, there are typically a number of expansion card openings which an operator may use for installing and accessing optional expansion cards and cables in the computer. Examples of common expansion cards include video input and output cards, etc. Expansion card openings which are not being used are typically covered with plates, doors, etc.

Typically, a chassis having an NLX I/O back panel opening and expansion slots, is manufactured by providing two separate openings in a back wall of the chassis. Generally, a first opening conforming to NLX standards is punched in the back wall, and a second opening is punched in the panel for the expansion slots. Typically, the opening for the expansion slots is large enough to hold a slot bracket comprising, for example, three expansion slots. The slot bracket is manufactured separately and inserted into the opening for the expansion slots and fastened with screws or by welding, or any other method. The punching out of the two openings requires a precise manufacturing procedure. It is important that each opening is punched in exactly the right place so that components within the chassis properly align with the openings. It is also important that the openings are not punched too close to each other, because the structural integrity of the back panel is essential in supporting the chassis against the moderate amount of force which is typically used when connectors are inserted into the connections or expansion slots or removed from the same. The computer chassis helps maintain an EMI (seal) contact. If a side wall of the chassis, for example, is removed by sliding it out of the remaining computer chassis when for example a mother board is inserted or replaced, there is a chance the user will forget or omit to replace the sliding side wall when reassembling the computer. The missing side wall may subject the computer to detrimental EMI effects.

A conventional personal computer chassis also typically includes a top cover for enclosing the internal components of the computer. By removing the cover, the interior of the personal computer becomes accessible. The interior of the computer is commonly divided into two halves. In the first half, there is a motherboard and various input and output ports. There may also be a fan which draws air from the outside of the chassis into the chassis to provide cooling for the electrical components. In the other half of the interior, the power, supply unit is typically housed, as well as floppy drives, CD drives, and hard drives.

To gain access to the motherboard located in the first half of the interior, a side wall of the chassis is typically required to be removed. In this regard, it is desirable for the side wall to be removed or otherwise displaced from the chassis with minimal effort to allow the motherboard to be easily accessed. Additionally, it is desirable for the side wall to provide structural support of rigidity between the front and back walls of the chassis. Structural integrity is essential in a computer chassis, because the computer contains many components which are sensitive to mechanical force and shocks. Furthermore, absent sufficient structural support, corners of the chassis can become skewed thereby causing aesthetically unpleasing gaps to form between the chassis top cover and a face cover typically mounted on the front of the chassis. As mentioned, the computer chassis should help maintain an EMI shield for electronic reliability.

SUMMARY OF THE INVENTION

An aspect of the present invention relates to a personal computer chassis including a bottom element, front and back walls, and a side wall. The front wall is mounted to a front end of the bottom element, and the back wall is mounted to the back end of the bottom element. The side wall is hinged to a first side end of the bottom element. When the side wall is in a closed position, it is capable of engaging with the front wall and the back wall. When the side wall is in an open position, it provides an easy access to the interior of the chassis.

An advantage of the above aspect of the present invention is that the hinged side wall provides easy access to the interior of the chassis when the side wall is an open position. Also, in certain embodiments, the side wall can be opened and closed without the use of a tool. Moreover, in other embodiments, the side wall remains attached to the bottom element when opened such that the side wall can not readily be lost or misplaced.

Another aspect of the present invention relates to a computer chassis having a hinged side wall including reinforcement members extending generally perpendicularly outward from its edges, for improving the structural integrity of the chassis. In certain embodiments, the reinforcement members engage with the rest of the chassis when the side wall is in its closed position. In certain other embodiments, the hinged side wall is pivotally connected to a bottom element such that when the side wall is in its open position, the side wall lies substantially flat on a surface upon which a chassis is supported.

A further aspect of the present invention relates to a computer chassis having a back wall defining an access opening. The chassis also includes a slot bracket covering a portion of the access opening. The slot bracket includes at least one slot for providing access to I/O expansion ports inside the chassis. When the slot bracket is mounted in the opening in the back wall, the remainder of the access opening forms an opening suitable for an NLX I/O back panel. The slot bracket may be provided with a retaining bracket for holding at least one cover in place over unused slots of the slot bracket. In certain embodiments, the slot bracket can be removed without requiring tools.

These and various other advantages and features of novelty which characterize the invention are pointed out with particularity in the claims annexed hereto and forming a part hereof. However, for a better understanding of the invention, its advantages, and the objects obtained by its use, reference should be made to the accompanying drawings and descriptive matter which form a further part hereof, and in which there is illustrated and described a preferred embodiment of the invention.

BRIEF DESCRIPTION OF THE DRAWINGS

In the drawings, wherein corresponding reference numerals generally indicate corresponding parts throughout the several views.

DETAILED DESCRIPTION

Figure 7:
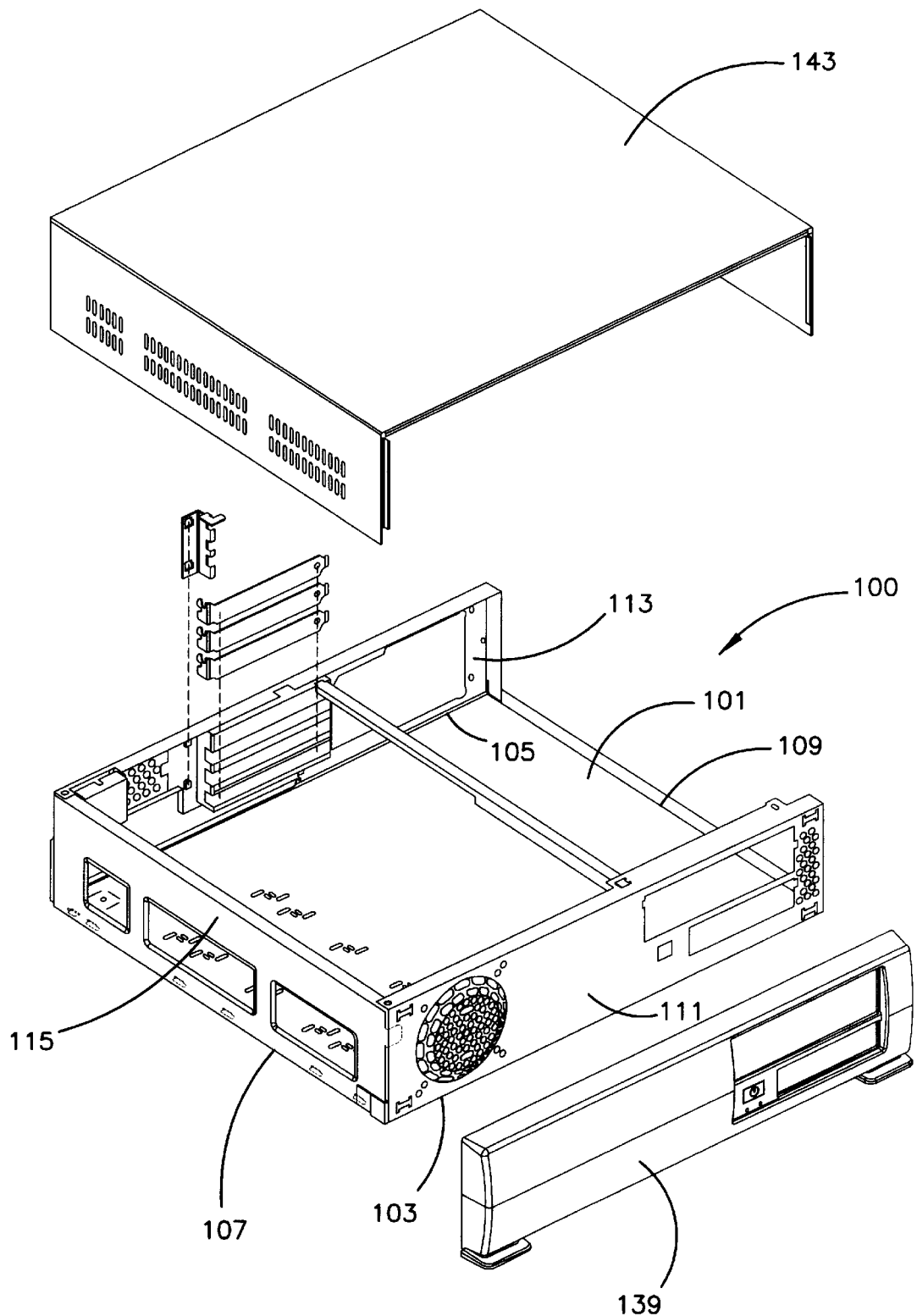
FIG. 7 is a general assembly view of a chassis including a top cover and a front face plate.

FIG. 7 shows an exemplary personal computer chassis 100 according to the invention. It is noted that no electric or electronic components of the computer are shown in FIG. 7. They have been omitted to allow the computer chassis 100 to be shown more clearly. The chassis 100 generally comprises a bottom element 101 with a front end 103, a back end 105, and first and second side ends 107 and 109, respectively. A front wall 1 11 is mounted to the front end 103. A back wall 113 is mounted to the back end 105. A side wall 115 is hinged to the first side end 107. A top cover 143 is used to cover the interior of the chassis 100. On the front wall 111 of the chassis 100 is typically also mounted a front face plate 139.

Figure 1:
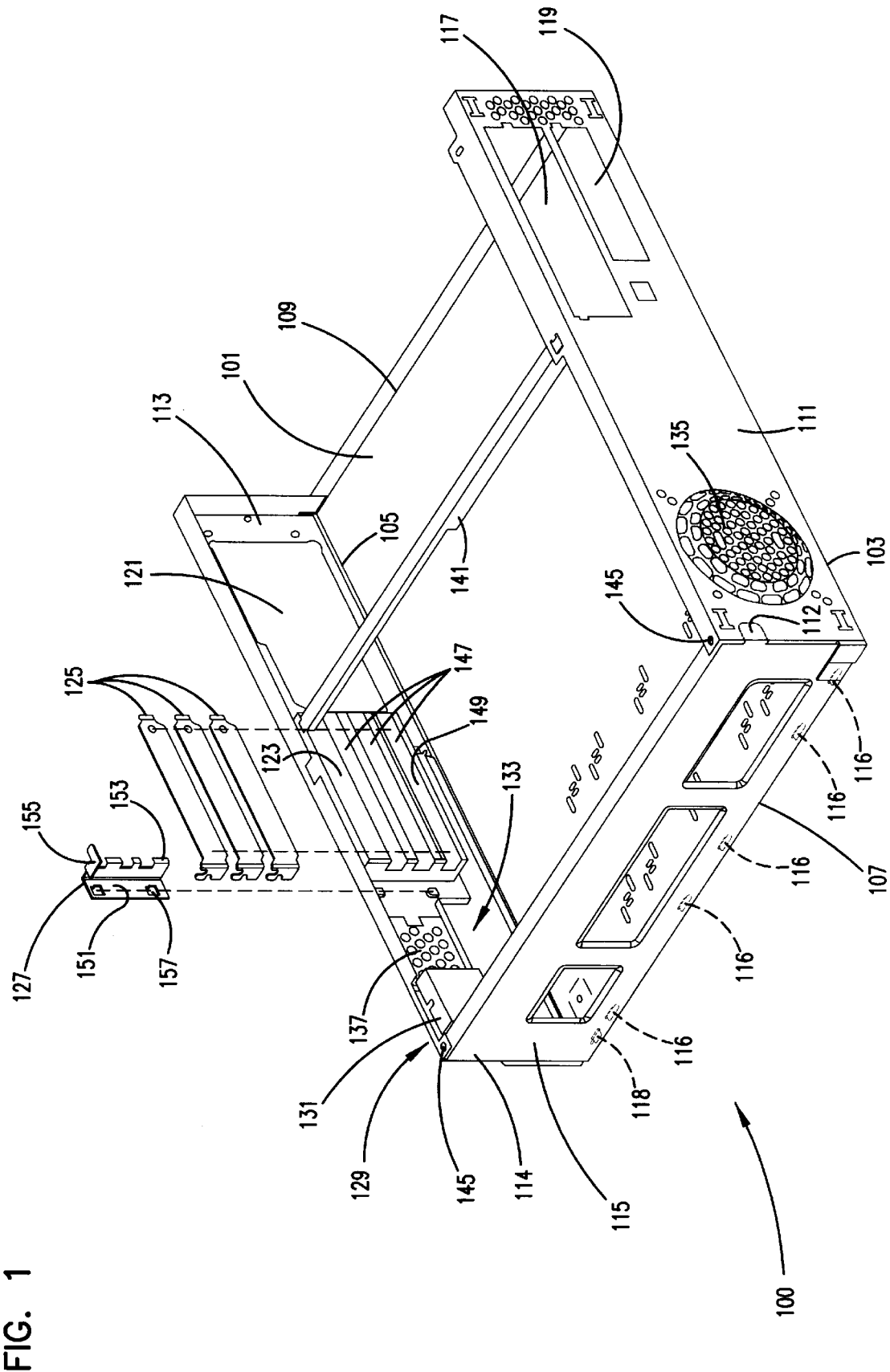
FIG. 1 is an isometric view of an embodiment of a personal computer chassis according to the invention.
Figure 2:
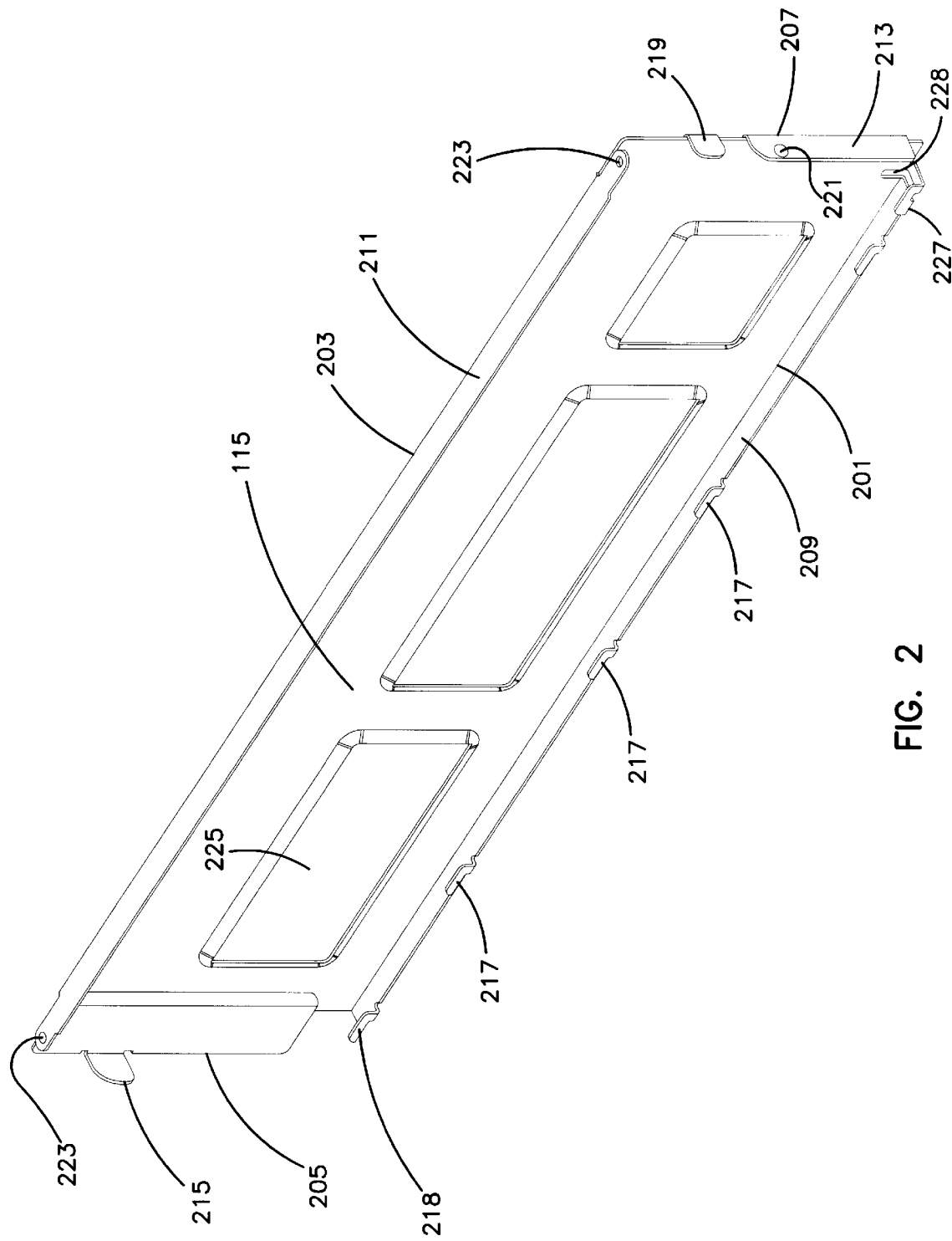
FIG. 2 is an isometric view of an embodiment of the hinged side wall according to the invention.
Figure 3:
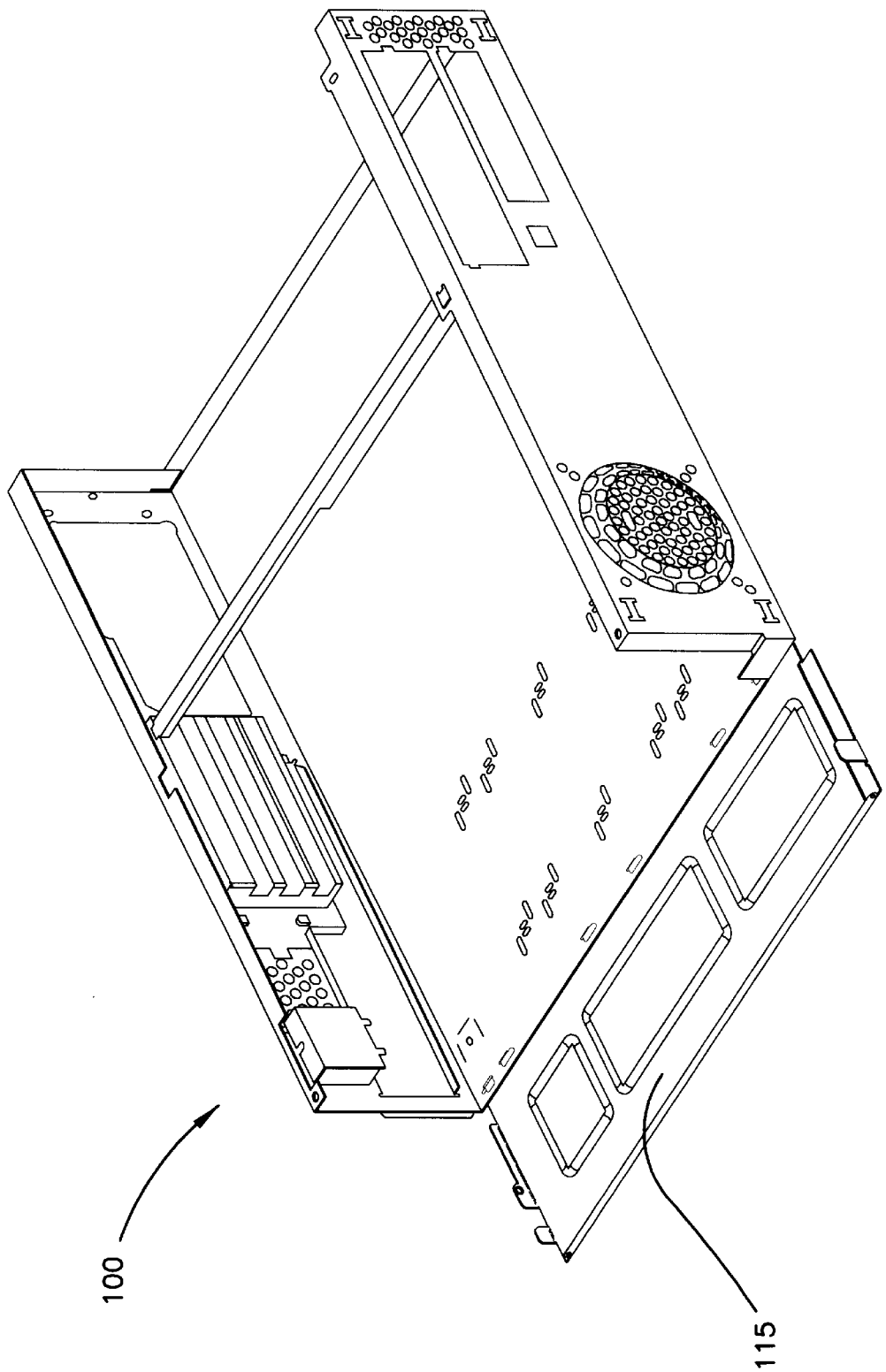
FIG. 3 is an isometric view of an embodiment of the chassis according to the invention, showing the side wall in its open position.

The drawings will now be described in detail starting with FIG. 1, where the chassis 100 is shown without the top cover 143 and the front face plate 139. As noted in the background of the invention, a personal computer typically provides a floppy drive, a CD drive, and a hard drive, as well as an internal power supply unit. A floppy drive is typically mounted in the chassis 100 such that it is accessible from the outside through opening 119. A CD drive is typically mounted in the chassis 100 such that it is accessible from the outside through opening 117. A power supply unit, typically comprising a transformer, is mounted in the computer chassis such that a power cord may run through opening 121 to an external power outlet, such as a wall outlet. The opening 121 may also be used for supply of outside air that can be used in cooling the internal power unit with a fan (not shown). The portion of the interior of the chassis where the motherboard is to be located is typically also cooled using a fan (not shown). For example, the fan may draw air from the outside through opening 135 in the front wall 111, and heated air may exit the chassis 100 through the opening 137 in the back wall 113.

As noted in the background of the invention, the chassis 100 is designed particularly in accordance with the NLX form factor specifications. An NLX motherboard is typically provided with an accelerated graphics port (AGP). The AGP is connected to the motherboard (not shown) and may be connected to an outside connector through the opening 129. When an AGP is not used, the opening 129 may be covered by a cover 131. The AGP is a high-performance, component-level interconnect targeted at 3D graphical display applications.

The bottom element, front and back walls, side wall, slot bracket, covers, and retaining bracket may all be manufactured from materials suitable for forming a personal computer chassis. For example, the parts may all be manufactured from galvanized steel, which may be shaped into a desired configuration, and into which holes may be punched to form openings.

Referring now to FIGS. 1–4, the side wall 115 may include a bottom edge 201, a top edge 203, and front and back edges 205 and 207, respectively. The side wall 115 is hinged to the bottom element 101 at the bottom edge 201. The side wall 115 may include at least one reinforcement member extending generally perpendicularly outward from at least one of the top edge 203, bottom edge 201, and front and back edges 205 and 207, respectively, for increased stability and rigidity. For example, the side wall 115 may have a reinforcement member 209 at the bottom edge 201. The reinforcement member 209 has a plurality of hinge blades 217, which are substantially perpendicular to the reinforcement member 209 and substantially parallel to the side wall 115. The hinge blades 217 may fit from underneath the bottom element through openings 116 to form a pivotal hinge between the side wall 115 and the bottom element 101. The hinge blades 217 may have nose portions 218 extending to the side of the hinge blades, for example, towards the front edge 205 of the side wall 115. As will be described with further detail below, the nose .portions 218 may aid in forming and maintaining the pivotal hinge.

Figure 4:
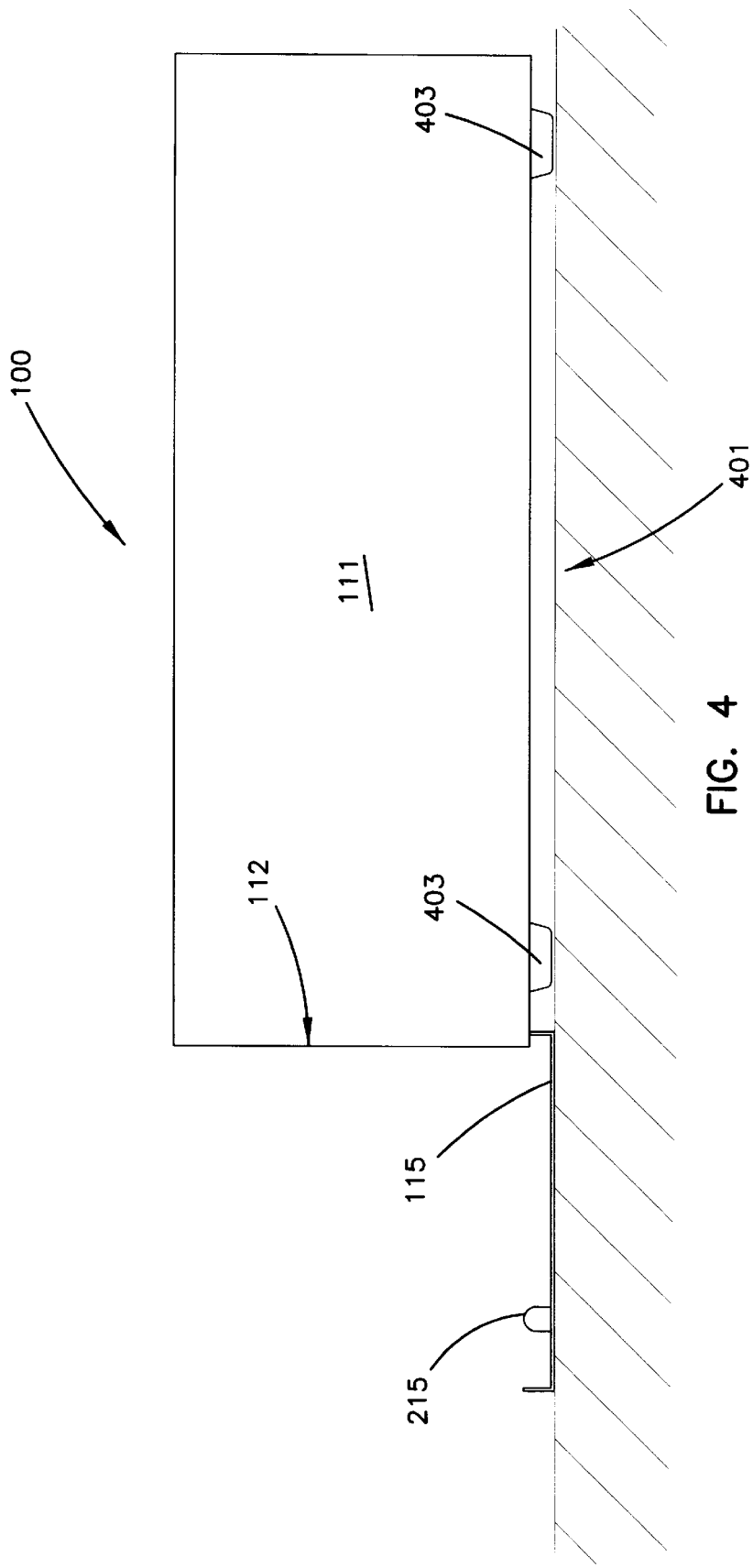
FIG. 4 is a side view of an embodiment of the chassis according to the invention, with the side wall in its open position.

The reinforcement member 209 and the hinge blades 217 may be configured such that when the side wall 115 is in its open position, the side wall 115 lies substantially flat on a surface 401 on which the chassis 100 is supported, as illustrated in FIG. 4. In the open position, the hinge blades 217 are substantially flat against the bottom element 101. It is advantageous that the side wall 115 is substantially flat against the supporting surface because such a configuration allows the interior of the chassis and in particular the motherboard to be conveniently accessed. It is also an advantage that the hinge blades 217 are substantially flat against the bottom element 101, because in the flat orientation the hinge blades 217 provide the least interference for inserting or removing the motherboard from the interior of the chassis.

As more particularly illustrated in FIG. 4, the reinforcement member 209 may have a width substantially equal to a height of supporting feet 403 mounted underneath the bottom element 101. Due to this, the side wall 115 will lie substantially flat on a supporting surface 401, and the hinge blades 217 are substantially flat against the bottom element 101 when the side wall 115 is in its open position. An advantage of this arrangement is that the reinforcement member 209 provides additional structural integrity to the bottom element 101 while the side wall 115 is in the open position. As can be seen from FIGS. 2 and 4, the reinforcement member 209 extends substantially over the entire length of the side wall 115. When the side wall 115 is in the open position, the reinforcement member spans the gap between the bottom element 101 and the supporting surface 401. In this manner, the reinforcement member 209 prevents the bottom element 101 from being depressed towards the supporting surface 401, for example, while a motherboard is being inserted or removed.

The reinforcement member on the front edge 205 of the side wall 115 may comprise a tab member 215. The tab member 215 may be configured to fit closely in an opening 112 in the front wall 111 when the side wall 115 is in its closed position. The close fit between the tab member 215 and the opening 112 adds structural integrity to the chassis 100, and in particular, to the front wall 111, while the side wall is in its closed position. Specifically, the tab member 215 assists in keeping the front corner of the chassis 100 square.

The reinforcement member on the back edge 207 of the side wall 115 may comprise a tab member 219. The tab member 219 may be configured to fit closely in an opening 114 in the back wall 113 when the side wall 115 is in its closed position. The close fit between the tab member and the opening 114 adds structural integrity to the chassis, and in particular, to the back wall 113, while the side wall 115 is in its closed position. Specifically, the tab member 219 assists in keeping the rear corner of the chassis 100 square.

The back edge 207 of the side wall 115 may further include a flange 213 with an internally threaded opening 221. The flange 213 may closely abut the back wall 113 when the side wall is in its closed position. The internally threaded opening 221 may receive a screw inserted through the back wall 113 when the side wall is in its closed position. By the flange 213 substantially abutting the back wall 113, the side wall adds structural integrity to the chassis, and in particular, to the back wall 113. By fastening the flange 213 to the back wall with a screw as described above, further structural integrity is obtained in the chassis, and the side wall is locked in its closed position.

The reinforcement member 211 on the top edge 203 of the side wall 115 may comprise detents adjacent the front and back edges of the side wall. The detents may serve the purpose of engaging front and back walls of the chassis and hold the side wall in its closed position. For example, the detents may include upwardly extending bumps 223 which engage with corresponding openings 145 in the front and back walls 111 and 113, respectively, of the chassis 100. The engagement between the bumps 223 and the openings 145 adds structural integrity to the chassis. In particular, in an embodiment where the screw fitted through the back wall 113 into the internally threaded opening 221 is not inserted until the cover 143 has been placed on the chassis from above, the detents are advantageous in that they hold the side wall 115 in its closed position until the chassis 100 has been assembled and the screw is fitted through the cover 143, through the back wall 113, and into the internally threaded opening 221, to hold the cover 143 in place, and also to hold the side wall 115 in its closed position.

The reinforcement member 209 on the bottom edge 201 of the side wall, may further include a locking portion 227 configured to prevent the hinge blades 217 from being inadvertently removed from the openings 116 once they have been inserted. As can be seen from FIG. 2, the locking portion 227 may essentially comprise a portion of the reinforcement member 209 and a hinge blade 217, defined by forming a substantially rectangular opening 228 from the mentioned elements and from the side wall 115. The corresponding opening which receives the locking portion 227 is identified as opening 118 in FIG. 1. The opening 118 may have a shape different from that of the corresponding openings 116 to facilitate the insertion of the locking portion 227 and to prevent the locking portion from inadvertently being removed from the opening 118.

The reinforcement member 209 including the locking portion 227 and the opening 228, and the opening 118 will be further described by the following example of how the side wall 115 may be fitted to and subsequently removed from the bottom element 101. The side wall 115 is mounted to the bottom element 101 by inserting the hinge blades 217 into the corresponding openings 116. The opening 118 which corresponds to the locking portion 227 is a generally rectangular opening with a notch towards the one of its sides that is closest to the back wall 113. When all hinge blades 217 have been inserted somewhat in their corresponding openings 116, the locking portion 227 may be inserted into the opening 118, and more particularly with part of the locking portion 227 in the notch of the opening 118. In order to achieve this, the locking portion 227 may be biased slightly away from its normal position to facilitate insertion of the locking portion into the opening 118. Once the hinge blades 217 and the locking portion 227 have been inserted into the openings 116 and 118, respectively, the side wall 115 can be opened or closed without inadvertently being removed from the bottom element 101. In the open position, the hinge blades 217 are flat against the bottom element 101 and prevent inadvertent removal of the side wall 115 from the bottom element 101. In the closed position, the nose portions 218 of the hinge blades about the bottom element 101 and prevent inadvertent removal of the side wall 115 from the bottom element 101.

Figure 5:
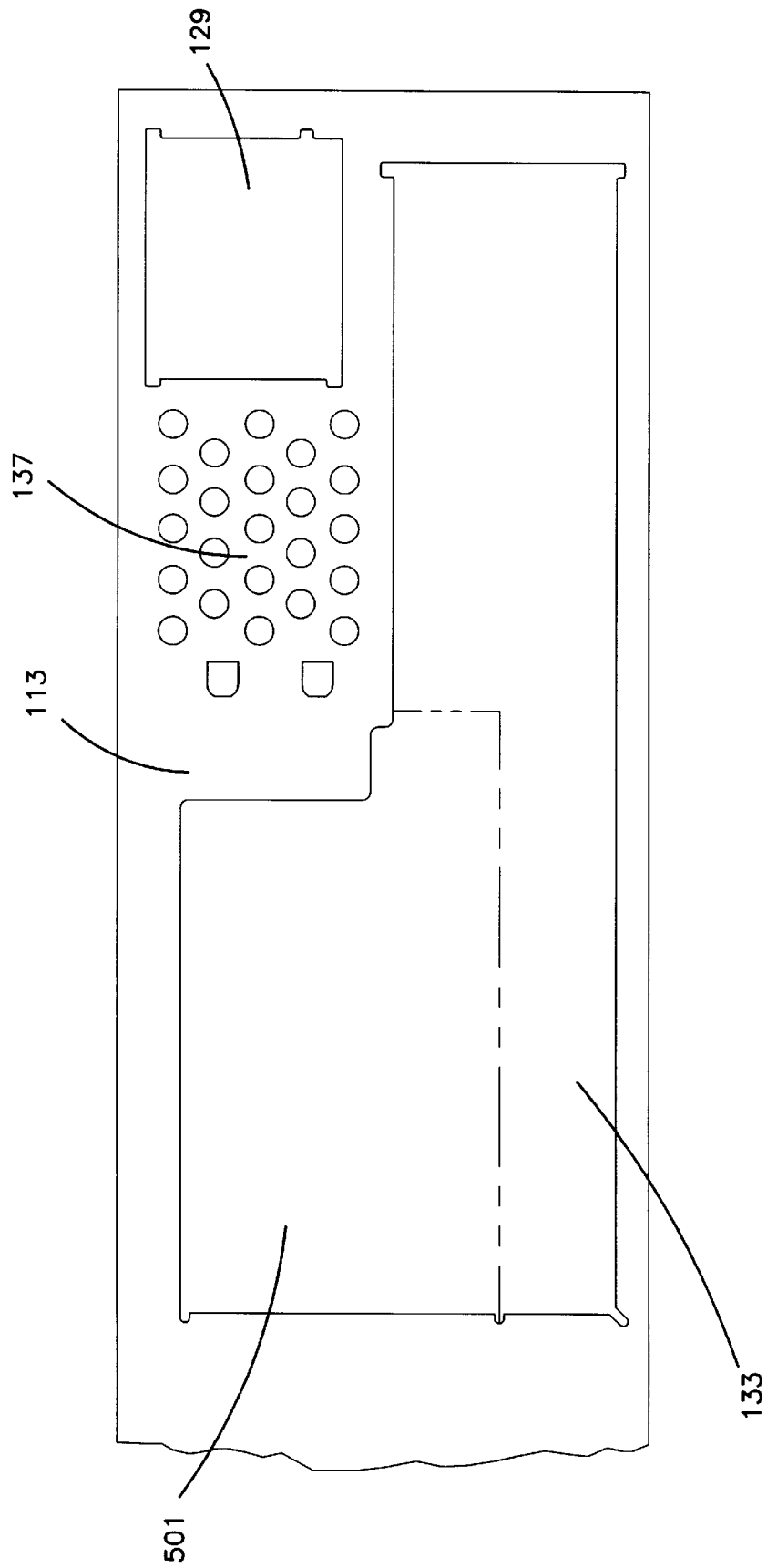
FIG. 5 is a front view of an embodiment of the back wall of a chassis according to the invention, showing the opening without a slot bracket.
Figure 6:
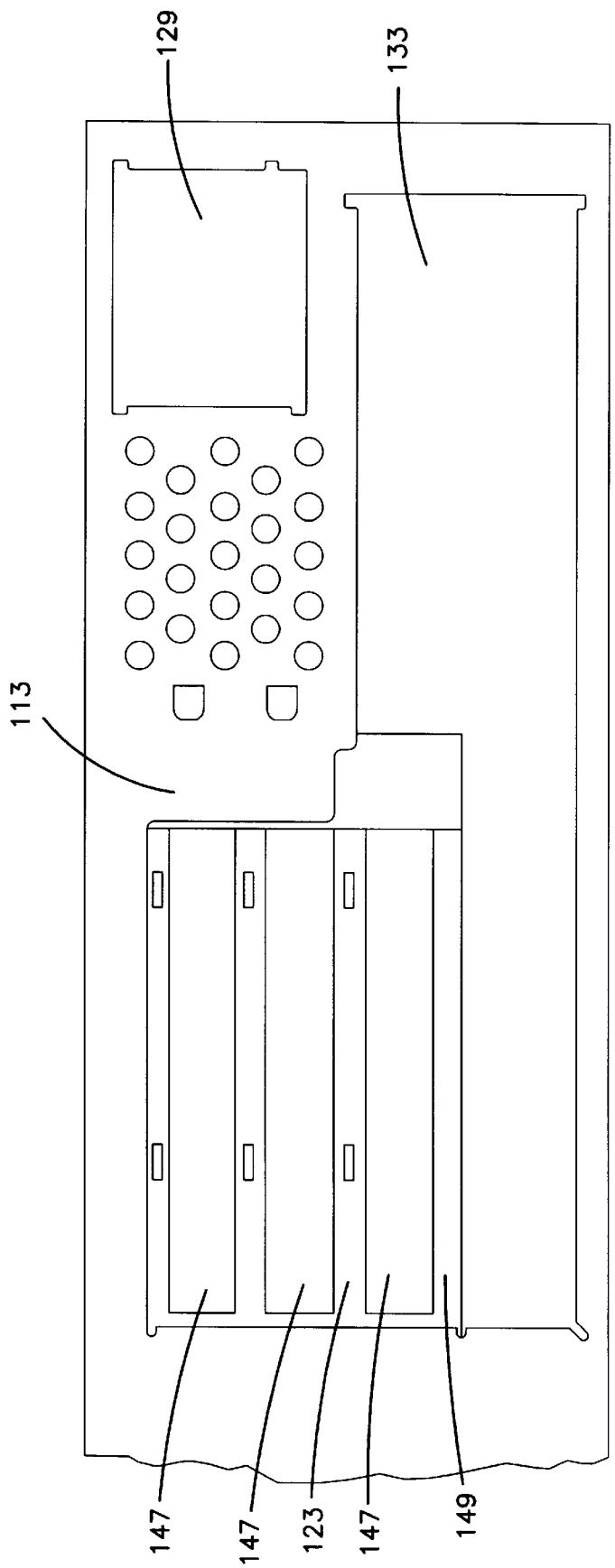
FIG. 6 is a front view of an embodiment of the back wall of a chassis according to the invention, showing the opening with the slot bracket mounted in place.

To facilitate the connection of cables, etc. to the interior components of the computer, an opening is formed in the back wall 113 as illustrated in FIG. 5. The opening may be formed adjacent to the AGP opening 129 and the ventilation opening 137. The opening is shown consisting of two portions, opening 133 and opening 501. The total opening may be formed by punching out a portion of the back wall 113 using well known techniques. As is also apparent from FIG. 5, the total opening is rather simple, and is therefore relatively easy to form in the manufacturing process. A slot bracket 123 may be mounted on the back wall 113, such that it covers the opening 501, as illustrated in FIGS. 5–6. The slot bracket 123 is typically used to provide a plurality of slots 147, through which I/O expansion ports may be accessed. At the bottom of slot bracket 123 there is located a horizontal ledge 149. The horizontal ledge 149 extends substantially over the entire width of the slot bracket and thereby forms a top boundary of the opening 133. The opening 133 remains unblocked when the slot bracket 123 has been fitted into the opening 501 in the back wall. The shape and size of the total opening and of the slot bracket 123 and its horizontal ledge 149 has been carefully determined so that the opening 133 is sized and shaped to receive a conventional I/O shield in the back wall 113. In a particular embodiment of the invention, the opening 133 forms an I/O shield opening in accordance with an NLX form factor specification, as discussed in the background of the invention. The described way of forming the opening 133, is advantageous in that it requires fewer manufacturing steps than current chassis. Accordingly, fitting the slot bracket 123 in the opening 501 to form the opening 133 is a convenient way of providing slots for I/O expansion ports and a I/O shield opening in accordance with an NLX standard. Additionally, the configuration helps to minimize the profile of elevation of the chassis. Furthermore, the configuration of the slot bracket 123 assists in providing rigidity to the back wall 113.

The chassis 100 may comprise three slots 147 in the slot bracket 123, three corresponding cover pieces 125, and a retaining bracket 127, capable of being mounted on the slot bracket 123 to hold at least one of the cover pieces 125 in place. For example, the retaining bracket 127 may comprise a back portion 151, a side portion 153, and a top portion 155. The back portion 151 may be substantially flat and have a plurality of openings 157 which are capable of receiving catches 159 extending from the back wall 113 and extending upward. The retaining bracket 127 may be mounted on the back wall 113 by inserting the catches 159 in the openings 157 and advancing the retaining bracket 127 downward to a locked position. The side portion 153 extends perpendicularly from the back portion 151 adjacent the slot bracket 123. The side portion 153 comprises finger members which extend towards the slots 147 in the slot bracket 123. The finger members are capable of holding at least one of the cover pieces 125 in place. The top portion 155 is substantially perpendicular to the back portion 151 and to the side portion 153. The top portion 155 is capable of abutting the cover 143 mounted on top of the chassis such that the retaining bracket 127 is held in its locked position. The retaining bracket 127 provides an easy way of inserting or removing one or more cover pieces 125 in front of the slots 147, since no tools need to be used. The retaining bracket 127 also provides secure holding of one or more cover pieces 125 when one or more slots 147 is not being used.

It is to be understood, that even though numerous characteristics and advantages of the invention have been set forth in the foregoing description, together with details of the structure and function of the invention, the disclosure is illustrative only, and changes may be made in detail, especially in matters of shape, size, and arrangement of the parts within the principles of the invention to the full extent indicated by the broad general meaning of the terms in which the appended claims are expressed.

I claim:

1. A personal computer housing comprising a chassis and a cover capable of being releasably mounted on the chassis, the chassis comprising:

a bottom element, having a front end, a back end, and first and second side ends;

a front wall, mounted to the front end of the bottom element;

a back wall, mounted to the back end of the bottom element; and a side wall, hinged to the first side end of the bottom element and capable of engaging with the front wall and the back wall, whereby the side wall provides increased structural integrity to the chassis in a closed position, and whereby an interior of the chassis is easily accessible when the side wall is in an open position, wherein the cover comprises at least one side portion which substantially covers the side wall when the cover is mounted on the chassis.

2. The personal computer housing of claim 1, wherein the side wall comprises a bottom edge, a top edge, and front and back edges, wherein the side wall is hinged to the first side end of the bottom element by the bottom edge of the side wall.

3. The personal computer housing of claim 2, wherein the side wall includes at least one reinforcement member extending generally perpendicularly outward from at least one of the top edge, bottom edge, and front and back edges of the side wall for increased stability.

4. The personal computer housing of claim 3, wherein the reinforcement member is located at the bottom edge of the side wall and has a plurality of hinge blades, the hinge blades being substantially perpendicular to the reinforcement member and substantially parallel to the side wall, wherein the hinge blades fit from underneath the bottom element through openings in the bottom element whereby a hinge between the side wall and the bottom element is formed.

5. The personal computer housing of claim 4, wherein the reinforcement member and the hinge blades are configured such that when the side wall is in its open position, the side wall lies substantially flat on a surface upon which the chassis is supported, and the hinge blades are substantially flat against the bottom element.

6. The personal computer housing of claim 5, wherein the reinforcement member has a width substantially equal to a height of supporting feet mounted underneath the chassis, whereby the side wall lies substantially flat on a surface upon which the chassis is supported, and the hinge blades are substantially flat against the bottom element when the side wall is in its open position.

7. The personal computer housing of claim 4, further comprising a locking portion for preventing that the hinge blades are inadvertently removed from the openings in the bottom element, formed by creating an opening in the hinge blade nearest the back edge, and in an adjacent part of the reinforcement member, and in an adjacent part of the side wall, whereby the locking portion may be biased from its normal position to facilitate insertion of the hinge blades into the openings in the bottom element.

8. The personal computer housing of claim 3, wherein the reinforcement member on the front edge of the side wall comprises a tab member, configured to fit closely in an opening in the front wall of the chassis when the side wall is in its closed position.

9. The personal computer housing of claim 3, wherein the reinforcement member on the back edge of the side wall comprises a tab member, configured to fit closely in an opening in the back wall of the chassis when the side wall is in its closed position.

10. The personal computer housing of claim 9, wherein the reinforcement member on the back edge of the side wall further comprises a flange with an internally threaded opening which can receive a screw inserted through the back wall when the side wall is in its closed position.

11. The personal computer housing of claim 3, wherein the reinforcement member on the top edge of the side wall comprises detents adjacent the front and back edges of the side wall, which detents can engage the front and back walls of the chassis and hold the side wall is in its closed position.

12. The personal computer housing of claim 11, wherein the detents include upwardly extending bumps which can engage with corresponding openings in the front and back walls of the chassis.

13. The personal computer housing of claim 1, the chassis further comprising a slot bracket covering a first part of an opening in the back wall, the slot bracket comprising at least one slot for providing access to I/O expansion ports inside the chassis and a horizontal ledge at the bottom of the slot bracket whereby a second part of the opening in the back wall is defined.

14. The personal computer housing of claim 13, wherein the opening in the back wall and the horizontally oriented ledge are configured such that the second part of the opening forms an I/O shield opening suitable for a motherboard to be used in the chassis.

15. The personal computer housing of claim 13, wherein the opening in the back wall and the horizontally oriented ledge are configured such that the second part of the opening forms an I/O shield opening in accordance with NLX form factor specification.

16. The personal computer housing of claim 13, wherein the slot bracket comprises three slots and cover pieces that can be inserted in front of each slot, and the chassis further comprises a retaining bracket capable of being mounted on the slot bracket to hold at least one cover piece in place.

17. The personal computer housing of claim 16, wherein the retaining bracket comprisies:
- a substantially flat back portion having a plurality of openings capable of receiving catches extending from the back wall and extending upward, whereby the retaining bracket can be mounted on the back wall by inserting the catches in the openings and advancing the retaining bracket downward to a locked position;
- a side portion extending perpendicularly from the back portion adjacent the slot bracket, the side portion comprising finger members which extend towards the slots in the slot bracket and are capable of holding at least one of the cover pieces in place; and
- a top portion substantially perpendicular to the back portion and to the side portion, capable of abutting the cover whereby the retaining bracket is held in its locked position.

18. The personal computer housing of claim 1, wherein the side wall is arranged and configured to interlockingly engage the front and back walls in the closed position.

19. A personal computer chassis, comprising:
- a bottom element, having a front end, a back end, and first and second side ends;
- a front wall, mounted to the front end of the bottom element;
- a back wall, mounted to the back end of the bottom element; and
- a side wall, hinged to the first side end of the bottom element and capable of engaging with the front wall and the back wall, whereby the side wall provides increased structural integrity to the chassis in a closed position, and whereby an interior of the chassis is easily accessible when the side wall is in an open position, the side wall comprising a bottom edge, a top edge, and front and back edges, wherein the side wall is hinged to the first side end of the bottom element by the bottom edge of the side wall, wherein the side wall includes at least one reinforcement member extending generally perpendicularly outward from the bottom edge of the side wall and having a plurality of hinge blades, wherein the reinforcement member and the hinge blades are configured such that when the side wall is in its open position, the side wall lies substantially flat on a surface upon which the chassis is supported, and the hinge blades are substantially flat against the bottom element.

20. A personal computer chassis, comprising:
- a bottom element, having a front end, a back end, and first and second side ends;
- a front wall, mounted to the front end of the bottom element;
- a back wall, mounted to the back end of the bottom element;
- a side wall, hinged to the first side end of the bottom element and capable of engaging with the front wall and the back wall, whereby the side wall provides increased structural integrity to the chassis in a closed position, and whereby an interior of the chassis is easily accessible when the side wall is in an open position, wherein the side wall comprises a bottom edge, a top edge, and front and back edges, wherein the side wall is hinged to the first side end of the bottom element by the bottom edge of the side wall wherein the side wall includes at least one reinforcement member extending generally perpendicularly outward from at least one of the top edge, bottom edge, and front and back edges of the side wall for increased stability, wherein the reinforcement member is located at the bottom edge of the side wall and has a plurality of hinge blades, the hinge blades being substantially perpendicular to the reinforcement member and substantially parallel to the side wall, wherein the hinge blades fit from underneath the bottom element through openings in the bottom element whereby a hinge between the side wall and the bottom element is formed; and a locking portion for preventing that the hinge blades are inadvertently removed from the openings in the bottom element, formed by creating an opening in the hinge blade nearest the back edge, and in an adjacent part of the reinforcement member, and in an adjacent part of the side wall, whereby the locking portion may be biased from its normal position to facilitate insertion of the hinge blades into the openings in the bottom element.

21. A personal computer chassis, comprising:
- a bottom element, having a front end, a back end, and first and second side ends;
- a front wall, mounted to the front end of the bottom element;
- a back wall, mounted to the back end of the bottom element;
- a side wall, hinged to the first side end of the bottom element and capable of engaging with the front wall and the back wall, whereby the side wall provides increased structural integrity to the chassis in a closed position, and whereby an interior of the chassis is easily accessible when the side wall is in an open position; and
- a slot bracket covering a first part of an opening in the back wall, the slot bracket comprising at least one slot for providing access to I/O expansion ports inside the chassis and a horizontal ledge at the bottom of the slot bracket whereby a second part of the opening in the back wall is defined, wherein the slot bracket comprises three slots and cover pieces that can be inserted in front of each slot, and the chassis further comprises a retaining bracket capable of being mounted on the slot bracket to hold at least one cover piece in place, wherein the retaining bracket comprises:
a substantially flat back portion having a plurality of openings capable of receiving catches extending from the back wall and extending upward, whereby the retaining bracket can be mounted on the back wall by inserting the catches in the openings and advancing the retaining bracket downward to a locked position;
a side portion extending perpendicularly from the back portion adjacent the slot bracket, the side portion comprising finger members which extend towards the slots in the slot bracket and are capable of holding at least one of the cover pieces in place; and
a top portion substantially perpendicular to the back portion and to the side portion, capable of abutting a cover mounted on top of the chassis whereby the retaining bracket is held in its locked position.

* * * * *